United States Patent [19]

Hanel et al.

[11] 3,762,979

[45] Oct. 2, 1973

[54] VINYLIDENE CHLORIDE-VINYL CHLORIDE COPOLYMER COMPOSITIONS FOR USE AS AN ADHESIVE SEAM IN FABRIC CONSTRUCTION

[75] Inventors: Phil G. Hanel; George A. Becker, both of Midland, Mich.

[73] Assignee: The Dow Chemical Company, Midland, Mich.

[22] Filed: Aug. 19, 1971

[21] Appl. No.: 173,297

[52] U.S. Cl. ............................. 156/333, 156/273
[51] Int. Cl. ............................ C09j 3/00, C09j 7/00
[58] Field of Search ........................ 260/873, 899; 156/333, 272, 273

[56] References Cited

UNITED STATES PATENTS

| | | | |
|---|---|---|---|
| 3,400,038 | 9/1968 | Burgess | 161/143 X |
| 3,576,778 | 4/1971 | Davis | 260/899 X |

Primary Examiner—William A. Powell
Attorney—William M. Yates et al.

[57] ABSTRACT

This invention is directed to compositions of normally crystalline copolymers of vinylidene chloride and vinyl chloride containing small amounts of a polycaprolactone resin, which compositions are particularly suited for use as an adhesive seam in fabric construction, e.g., in the dielectric bonding of woven or nonwoven fabric materials.

5 Claims, No Drawings

VINYLIDENE CHLORIDE-VINYL CHLORIDE COPOLYMER COMPOSITIONS FOR USE AS AN ADHESIVE SEAM IN FABRIC CONSTRUCTION

BACKGROUND

It is known that woven or nonwoven fabrics may be joined together using a thermoplastic polymer, generally in the form of a filament or film strip, as an adhesive seam material. Generally, such seam material is heated, e.g., dielectrically, to produce rapid melting with accompanying penetration of the melted material into the fabrics being joined.

The above system offers many advantages to industrial sewing operations including, increased speed, elimination of seam puckering and the formation of strong, water-tight seams.

An adhesive seam material, for use in dielectric sealing, must be characterized by having a dielectric loss factor greater than that of the fabric being joined to avoid overheating thereof, as well as a dielectric strength sufficient to prevent breakdown or arcing across the electrodes of conventionally used sealing apparatus, e.g., apparatus as described in U.S. Pat. No. 3,575,760 issued July 17, 1967. Further, such adhesive seam material must be capable of rapid melt flow at relatively low temperatures with accompanying penetration into the fabric. Still further, the adhesive seam material must provide a strong bond between the fabrics being joined.

It is the primary object of this invention to provide a thermoplastic adhesive seam material having a high dielectric loss factor, good dielectric strength, rapid melt flow at relatively low temperatures and which will form strong, waterproof bonds between a wide variety of natural and synthetic woven or nonwoven fabrics.

SUMMARY

The above and related objects are attained by utilizing, as an adhesive seam material, a composition comprising (1) a normally crystalline copolymer of vinylidene chloride and vinyl chloride and (2) between about 2 and 6 percent, based on copolymer weight, of a polycaprolactone resin of the structure

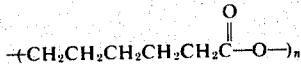

where $n$ can vary from about 100 to about 1000.

DESCRIPTION OF THE PREFERRED EMBODIMENTS

The normally crystalline copolymers of vinylidene chloride and vinyl chloride used in the present invention are well known in the art as being those copolymers which exhibit crystalline structures by X-ray diffraction patterns. Particularly useful for the purposes of the present invention, are such copolymers which contain from about 70 to 95 percent by weight of vinylidene chloride, with the balance being vinyl chloride. These copolymers may be easily fabricated into oriented fiber or film form, e.g., by fusing, supercooling and cold-working, as by stretching.

The polycaprolactone resins which have been found to be unexpectedly useful for the purposes of the present invention are known to the art as being composed of repeating sequences of nonpolar methylene groups and a relatively polar ester group.

It has been found that such polycaprolactones are compatible with the herein described normally crystalline copolymers of vinylidene chloride and vinyl chloride in amounts ranging up to at least about 10 percent based on copolymer weight, and exhibit usual plasticizing action with resultant lowering of temperature requirement for the melting of the crystalline copolymeric materials. It has been unexpectedly discovered, which discovery forms the present invention, that the addition of from about 2 to 6 percent of such polycaprolactones to the specified normally crystalline copolymers, based on copolymer weight, provides desirable melt flow characteristics and, additionally, significantly improved bond strength when such compositions are used as adhesive seam materials for the joining of woven or nonwoven plastic materials, e.g., by use of dielectric bonding techniques. That such result is unexpected is illustrated by comparisons, as specifically set forth hereafter, with other conventional plasticizers for such copolymers which, when used in the stated amounts, impart improved melt flow properties but adversely affect the bond strength performance of such compositions when used as adhesive seam materials for joining fabrics.

When preparing the polymeric compositions used in the process of this invention, it is important that a thorough and complete intimate mixing of the polymeric ingredients is effected. This is best accomplished by blending the polymeric materials while they are in a powdered or pulverant form, e.g., where the polycaprolactones are added individually or in combination with other plasticizers or stabilizers which may be desired.

Films and fibers can be fabricated from the compositions of the invention by any of the conventionally employed fabricating or extruding techniques.

The following nonlimiting examples, wherein all percentages and parts are by weight, illustrate the present invention:

EXAMPLE 1

In each of a series of experiments, to a normally crystalline copolymer prepared by the copolymerization of about 83 percent vinylidene chloride and 17 percent vinyl chloride (the copolymer additionally containing about 2 percent by weight of conventional formulation additives) was added, by blending, varying amounts of a polycaprolactone having the structural formula

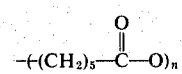

and a molecular weight of about 40,000. Each of the blends were extruded into monofilament utilizing conventional techniques, and the resulting filaments evaluated as an adhesive seam material for 3–4 oz. per yd.$^2$ woven cotton fabric, using a Model 201 Diaseal machine utilizing a constant throughput rate of 450 inches per minute with a variable power setting of 80 percent of maximum. Bond strength was determined as horizontal peel strengths on one-inch strips of the bonded fabric, obtained using a Scott Tensile Tester. The following Table No. I sets forth the concentration of polycaprolactone (PCL), the size and shape of the copolymeric filament used and the strength of the fabric bond produced:

TABLE I

| Sample No. | % PCL | Fiber Size (Mills) | Bond Strength (pounds/1 inch horizontal peel) |
|---|---|---|---|
| For Comparison | | | |
| 1 | 0 | 19.7 round | 12.8 |
| 2 | 1 | 19.1 round | 7.3 |
| 3 | 10 | 21.1 round | 10.5 |
| 4 | 0 | 7.3 × 124 | 10.4 |
| The Invention | | | |
| 5 | 3 | 19.3 round | 15 |
| 6 | 3 | 6.6 × 125 | 17.3 |

The above data specifically illustrate the beneficial bond strengths obtained by utilization of 3 percent, by weight, of a copolymer of a polycaprolactone having a molecular weight of about 40,000. Similar good results are obtained utilizing from about 2 to 6 percent by weight of such material.

EXAMPLE 2

In each of a series of additional experiments, to a normally crystalline copolymer prepared by the copolymerization of about 85 percent vinylidene chloride and 15 percent vinyl chloride (containing about 6 percent of conventional formulation additives) was added varying amounts of dibutyl sebacate (a conventional plasticizer for such copolymers) and a polycaprolactone of the type prescribed by the present invention. Each polymeric composition was evaluated for melt flow characteristics using a Brabender Plasticorder wherein torque versus time was measured during the melting of a 50 gram sample of the polymeric composition in a 60 milliliter mixing head. Roller type 5 blades were rotated at 63 RPM and the oil bath temperature was 137°C.

The information was evaluated by observing the initial, final and integral torque. The initial torque was determined after one minute of mixing. The final torque (20 minutes) was the point at which the composition was completely melted. The integral torque was an average devised to compare one sample relative to another, determined by the area of a curve plotted between 0.05 and 1.0 reciprocal minutes. Also measured were dielectric constants and loss factors at room temperature.

Portions of each of the blends were also extruded into monofilament utilizing conventional techniques, and the resulting filaments evaluated as an adhesive seam material as described in Example I using a power setting of 60 percent of maximum on the Diaseal machine. The following Table II sets forth the amounts of plasticizer dibutyl sebacate (DBS) and amount and type of polycaprolactone (PCL) used, melt flow properties of each composition, as well as fiber size and shape and bond strengths obtained.

TABLE II

| Sample No. | Percent DBS | Percent PCL | Fiber size | Melt flow Initial | Melt flow Final | Melt flow Integral | Dielectric constant | Dielectric loss factor | Bond strength (pounds) |
|---|---|---|---|---|---|---|---|---|---|
| For comparison: | | | | | | | | | |
| 7 | 4 | 0 | 6.9 x 129 | 730 | 250 | 493 | 2.85 | .0865 | 8 |
| The invention: | | | | | | | | | |
| 8 | 0 | 3² | 6.2 x 122 | 800 | 245 | 523 | 2.96 | .098 | 14 |
| 9 | 4 | 3¹ | 6.4 x 118 | 900 | 240 | 508 | 2.91 | .124 | 9 |
| 10 | 4 | 3² | 6.0 x 122 | 730 | 220 | 460 | 2.86 | .142 | 10 |

¹ PCL of mol. wt. about 15,000.
² PCL of mol. wt. about 40,000.

The above data illustrate the desirable melt flow and dielectric properties obtained in combination with unexpectedly enhanced fabric bond strengths, by utilization of the compositions comprising the present invention.

What is claimed is:

1. In the process of joining fabrics using a thermoplastic polymer as an adhesive seam, the improvement consisting of using as said thermoplastic polymer a normally crystalline copolymer of vinylidene chloride and vinyl chloride containing between about 2 and 6 percent based on the weight of said copolymer of a polycaprolactone resin of the structure

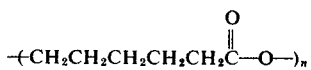

where $n$ can vary from about 100 to about 1,000 said copolymer being in the form of a filament or a film strip, and heating said filament or film strip to produce rapid melting thereof with accompanying penetration of the melted material into the fabrics being joined.

2. The process of claim 1 wherein said copolymer is in fiber form.

3. The process of claim 1 wherein said polycaprolactone has a molecular weight of about 40,000.

4. The process of claim 1 wherein said polycaprolactone has a molecular weight of about 15,000.

5. The process of claim 1 wherein said filament or film strip is melted by application of dielectric heating thereto.

* * * * *